US006409514B1

(12) United States Patent
Bull

(10) Patent No.: US 6,409,514 B1
(45) Date of Patent: Jun. 25, 2002

(54) METHOD AND APPARATUS FOR MANAGING TRAINING ACTIVITIES

(75) Inventor: Jeffrey A. Bull, Nampa, ID (US)

(73) Assignee: Micron Electronics, Inc., Nampa, ID (US)

(*) Notice: Subject to any disclaimer, the term of this patent is extended or adjusted under 35 U.S.C. 154(b) by 0 days.

(21) Appl. No.: 08/951,903

(22) Filed: Oct. 16, 1997

(51) Int. Cl.[7] .............................................. G09B 19/00
(52) U.S. Cl. ...................... 434/219; 434/118; 434/322; 434/362
(58) Field of Search .................. 434/219, 218, 434/350, 362, 351–353, 118, 322, 323

(56) References Cited

U.S. PATENT DOCUMENTS

| | | | | |
|---|---|---|---|---|
| 5,911,134 A | * | 10/1990 | Castonguay et al. | 705/9 |
| 5,111,391 A | * | 5/1992 | Fields et al. | 705/9 |
| 5,267,865 A | * | 12/1993 | Lee et al. | 434/350 |
| 5,270,920 A | * | 12/1993 | Pearse et al. | 7364/9 |
| 5,306,154 A | * | 4/1994 | Ujita et al. | 434/218 |
| 5,325,292 A | * | 6/1994 | Crockett | 705/9 |
| 5,326,270 A | * | 7/1994 | Ostby | 434/362 |
| 5,779,486 A | * | 3/1996 | Ho et al. | 434/362 |
| 5,823,781 A | * | 9/1996 | Hitchcock et al. | 434/118 |
| 6,035,278 A | * | 7/1997 | Mansour | 705/9 |
| 6,049,776 A | * | 5/1998 | Donnelly et al. | 705/8 |

OTHER PUBLICATIONS

Silton–Bookman Systems. Registrar for Windows Jun. 1996 1–14, 95–98, 123–124 and 191–197.*

* cited by examiner

Primary Examiner—Jessica J. Harrison
Assistant Examiner—Sheila Clayton
(74) Attorney, Agent, or Firm—Trop, Pruner & Hu, P.C.

(57) ABSTRACT

A method and apparatus for managing training activities are disclosed. In one embodiment, the invention is a method including scheduling the worker for a selected class in response to user input, tracking an available class the worker might attend; electronically determining whether the available class is the selected class; querying the worker about attending the available class if the available class is the selected class; receiving the worker's reply to the query; and enrolling the worker in the available class responsive to the reply. In another embodiment, the invention is a method including tracking a worker's training information; tracking information regarding a class available for the worker to attend; comparing the training information with the available class information; and automatically electronically contacting the worker regarding attending the available class responsive to the comparison.

28 Claims, 10 Drawing Sheets

METHOD AND APPARATUS FOR MANAGING TRAINING ACTIVITIES

BACKGROUND OF THE INVENTION

1. Field of the Invention

The present invention relates to a method and apparatus for managing a worker's training activities. More particularly, the invention pertains to an automated integrated, method implemented in software for use on a computer to track, schedule, and/or record a worker's training activities.

2. Description of the Related Art

Workers are frequently required to take some form of training. Sometimes the training orients the worker to a new workplace or to new work responsibilities by familiarizing the worker with available tools, resources, and procedures, or with the workplace environment. Such orientation training might be performed only once. Other times the training might update the worker on changing conditions affecting their performance. Such conditions might include federal and local regulations governing conduct in the workplace or new or different technological capabilities. Thus, this type of training might periodically be performed.

The type and frequency of training will depend on a number of factors including the worker's job responsibilities, the nature of the work performed in the workplace, and commitment to training the work force. Someone, whether it be the worker or a co-worker, must track the training requirements for the worker and worker's compliance with those requirements. For current purposes, this person will be referred to as the "trainer."

The trainer's job is very time-demanding. The trainer must keep track of the worker's training information such as what training classes must be attended, whether they have been attended, and the worker's performance in the attended classes. The trainer must also keep track of class scheduling information. This information might include, for example, the time and location of the class, the instructor, and the class enrollment. The trainer not only must track this information, but must also coordinate the information to ensure that the right workers get to the right classes and to make sure each worker receives the proper training. Finally, the trainer must communicate with all involved parties, whether by telephone, electronic mail, postings, publication, or otherwise.

Most of the trainer's tasks are automated to some degree, but each task typically requires a separate software package. To schedule a single worker for a single class, the trainer might have to use several database programs, a word processing program, and a communications application. This arrangement requires great effort to keep all the information current and accurate in each package, including repetitive entry of information. This arrangement also requires the trainer to be conversant with many software packages for different kinds of applications. The effort and technical capability costs the worker's employer and/or the trainer's employer both directly in terms of time and training and indirectly in diversion of human resources from other revenue producing activities. Thus, there is a need for a new integrated, automated approach to tracking a worker's training activities.

SUMMARY OF THE INVENTION

A method and apparatus for managing training activities are disclosed. In one embodiment, the invention is a method comprising scheduling the worker for a selected class in response to user input, tracking an available class the worker might attend; electronically determining whether the available class is the selected class; querying the worker about attending the available class if the available class is the selected class; receiving the worker's reply to the query; and enrolling the worker in the available class responsive to the reply. In another embodiment, the invention is a method comprising tracking a worker's training information; tracking information regarding a class available for the worker to attend; comparing the training information with the available class information; and automatically electronically contacting the worker regarding attending the available class responsive to the comparison.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

DETAILED DESCRIPTION OF SPECIFIC EMBODIMENTS

Numerous specific details are set forth below in the detailed description of particular embodiments to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described for the sake of clarity so as not to obscure the invention. It will be appreciated that supplying such details would be a routine undertaking for those of ordinary skill in the art, even if a complex and time-consuming task, given the benefit of this disclosure.

Some portions of the detailed descriptions below are presented in terms of a software implemented method and/or symbolic representations of operations on data bits within a computer memory. These descriptions and representations are the means used by those skilled in the art to most effectively convey the substance of their work to others skilled in the art. A software implemented method is here, and is generally, conceived to be a self-consistent sequence of acts leading to a desired result. The acts require at some level physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, all of these and similar terms are to be associated with the appropriate physical quantities and are merely convenient labels applied to these quantifies. Unless specifically stated or as may otherwise be apparent from the above discussions, terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
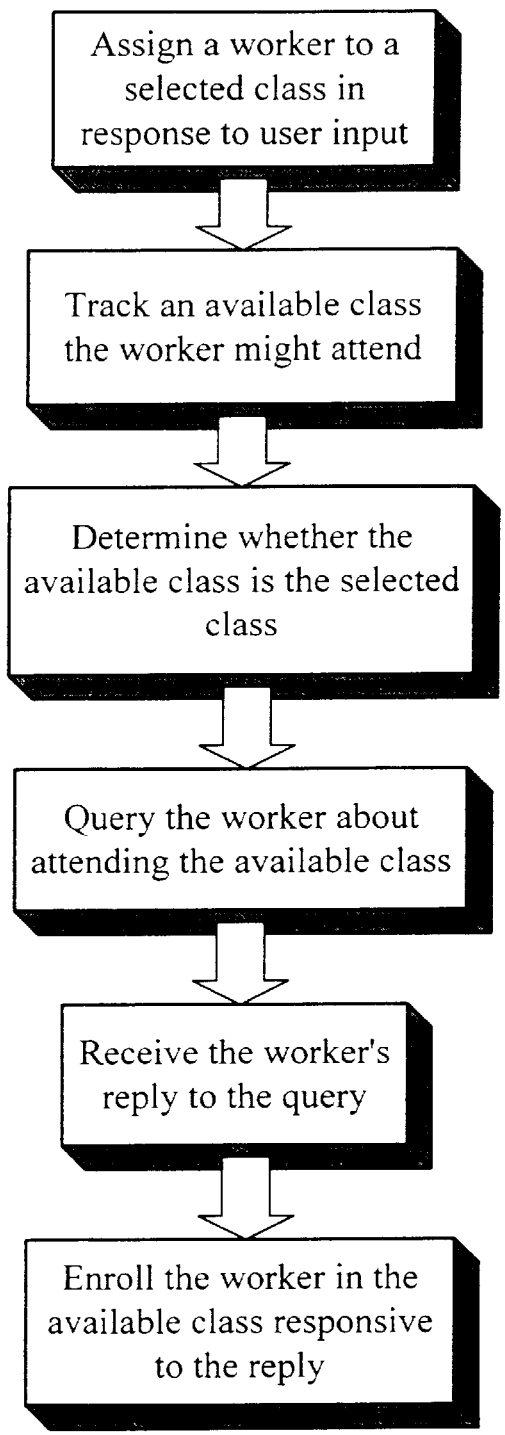
FIG. 1 illustrates a method for managing a worker's training activities as employed by one embodiment of the invention.

FIG. 1 illustrates the method employed by one embodiment of the invention for managing a worker's training activities. As shown in FIG. 1, this particular embodiment assigns the worker to take a selected class in response to user input while tracking an available class the worker might attend. A "selected class" is a class that the worker must or should take under a given set of criteria. An "available class" is one that will be given based on individual worker's training needs. The application then determines whether the available class is the selected class to which the worker was previously assigned. If the available class is one to which the worker was assigned, the application queries the worker about attending the available class. Upon receiving the worker's reply to the query, the application then enrolls the worker in the available class responsive to that reply.

The act of assigning the worker for the selected class might include any one of a number of tasks depending on the particular embodiment employed. For instance, "assigning" might include any one or more of: comparing the available class against a list classes previously attended by the worker; assigning the worker to attend a predetermined plurality of core classes including the available class; assigning the worker to attend the selected class where the selected class has not previously been offered; and permitting the worker to attend the selected class upon request. Indeed, in some embodiments, the act of scheduling might include all these subtasks.

The act of tracking the available class similarly might include a number of subtasks. For example, again depending on the particular embodiment employed, tracking might include any one or more of: scheduling the available class; scheduling a plurality of course sections for the available class; and recording the enrollment of the available class. A class needing an enrollment larger than can be handled by available facilities can therefore be broken into course sections and the enrollment spread across the various sections. In this case, the enrollment might be tracked in terms of the enrollment for individual course sections.

Because the assigning and the tracking are performed by a single application, the application can electronically determine whether the available class is the selected class the worker has been scheduled to attend. This determination can be performed in at least two ways. First, the application can compare the available class with a list of classes previously attended by the worker. Second, the package can compare identifying information about the available class with identifying information about the selected class. However, other approaches for making this electronic determination may also be used.

Some embodiments might also automatically and electronically query the worker about attending the available class. Also, some embodiments might electronically receive the worker's reply to the query. In the latter case, the package can also automatically enroll the worker in the available class, or class section, in response to the reply.

Finally, the act of tracking the worker's performance in the class also might include a number of tasks. Tracking the worker's performance might includes one or more of: documenting the worker's performance; electronically storing the worker's performance; and electronically notifying the worker of the worker's performance. If the particular embodiment employs electronic grading of tests, the results could be transferred electronically to the package and the package could then automatically and completely electronically track the worker's performance. This act might also include printing hard copy records and certifications.

Figure 2:
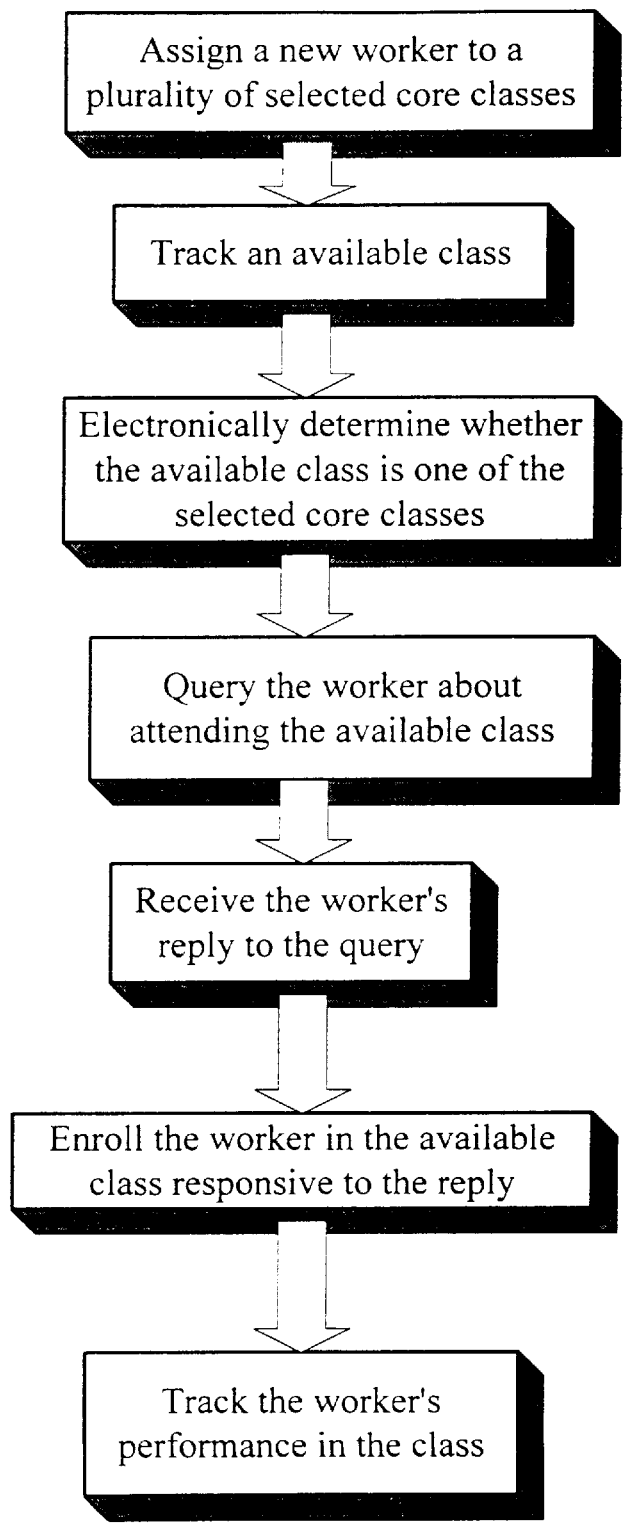
FIG. 2 illustrates an alternative method for managing a worker's training activities.

FIG. 2 illustrates one particular embodiment in which the embodiment of FIG. 1 may be used to manage a new worker's training activities relative to a core of classes intended to orient the worker to a new workplace. In some embodiments, the available class is one of the core classes. However, each of the core classes might in turn be treated as an available class. A worker might also be scheduled for a particular class along with a large number of co-workers such that the class is broken into a plurality of course sections. In embodiments where this occurs, each of the course sections may be treated as individual courses. Note that each of the co-workers required to take the class may be enrolled in a course section in the same manner and that this particular embodiment tracks the worker's performance in the class.

Figure 3:
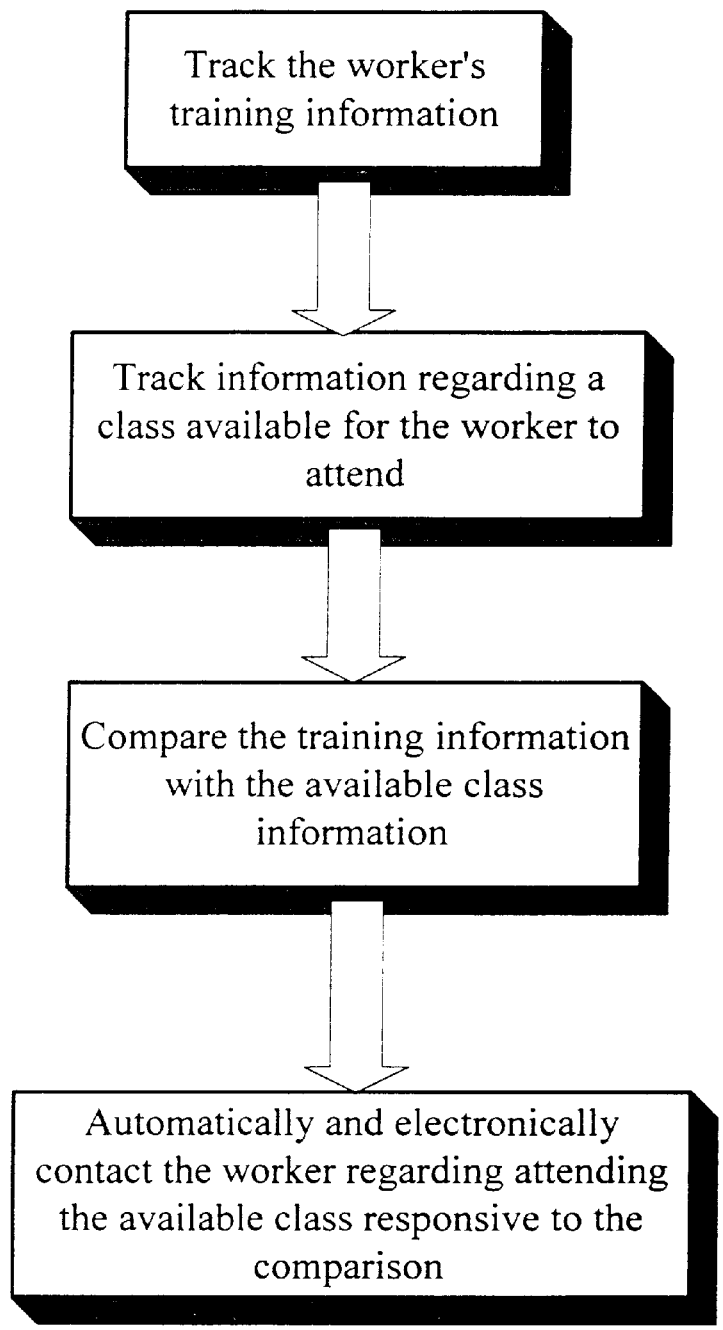
FIG. 3 illustrates a second embodiment alternative to that of FIG. 1.

Turning now to FIG. 3, some embodiments of the invention automatically and electronically query the worker about attending the available class. More particularly, this embodiment tracks a worker's training information, tracks information regarding a class available for the worker to attend, compares the training information with the available class information, and automatically electronically contacts the worker regarding attending the available class responsive to the comparison. In this context, "automatically" means under computer control without the trainer's intervention. The contact may be by phone messaging, electronic mail, or both. Other forms of electronic communication may also be suitable for this purpose. Further, the worker may be electronically contacted over an intranet, a local area network, the Internet, a wide area network, a telephone system, or some combination of these.

The act of tracking a worker's training information in this particular embodiment typically includes one or more subtasks. Exemplary subtasks include: maintaining a list of any class attended by the worker; scheduling the worker for a first selected class in response to user input; assigning the worker to attend a predetermined plurality of core classes including the available class; assigning the worker to attend a second selected class that has not previously been offered; and permitting the worker to attend the selected class upon request. Still other subtasks may be suitable in other embodiments.

The acts of tracking the available class and electronically comparing the training information with the class scheduling information likewise may include various subtasks. For example, tracking the available class information might include one or more of scheduling the available class, scheduling a plurality of course sections for the available class, and recording the enrollment of the available class. The electronic comparison might include one of more of: comparing the available class with a list of classes previously attended by the worker; comparing the available class information with a list of classes the worker is scheduled to attend; and comparing identifying information about the available class with identifying information about the selected class.

The embodiment of FIG. 3 might also include some tasks as are found in the embodiment of FIG. 1. For instance, the embodiment of FIG. 3 might further comprise: receiving the worker's reply to the query; enrolling the worker in the available class responsive to the reply; and tracking the worker's performance in the available class. The embodiments of FIGS. 1 and 3 might also be combined to produce yet another embodiment in which the worker is automatically and electronically queried after the electronic determination is made. These and other such variations are all considered with the scope and spirit of the invention.

Figure 4:
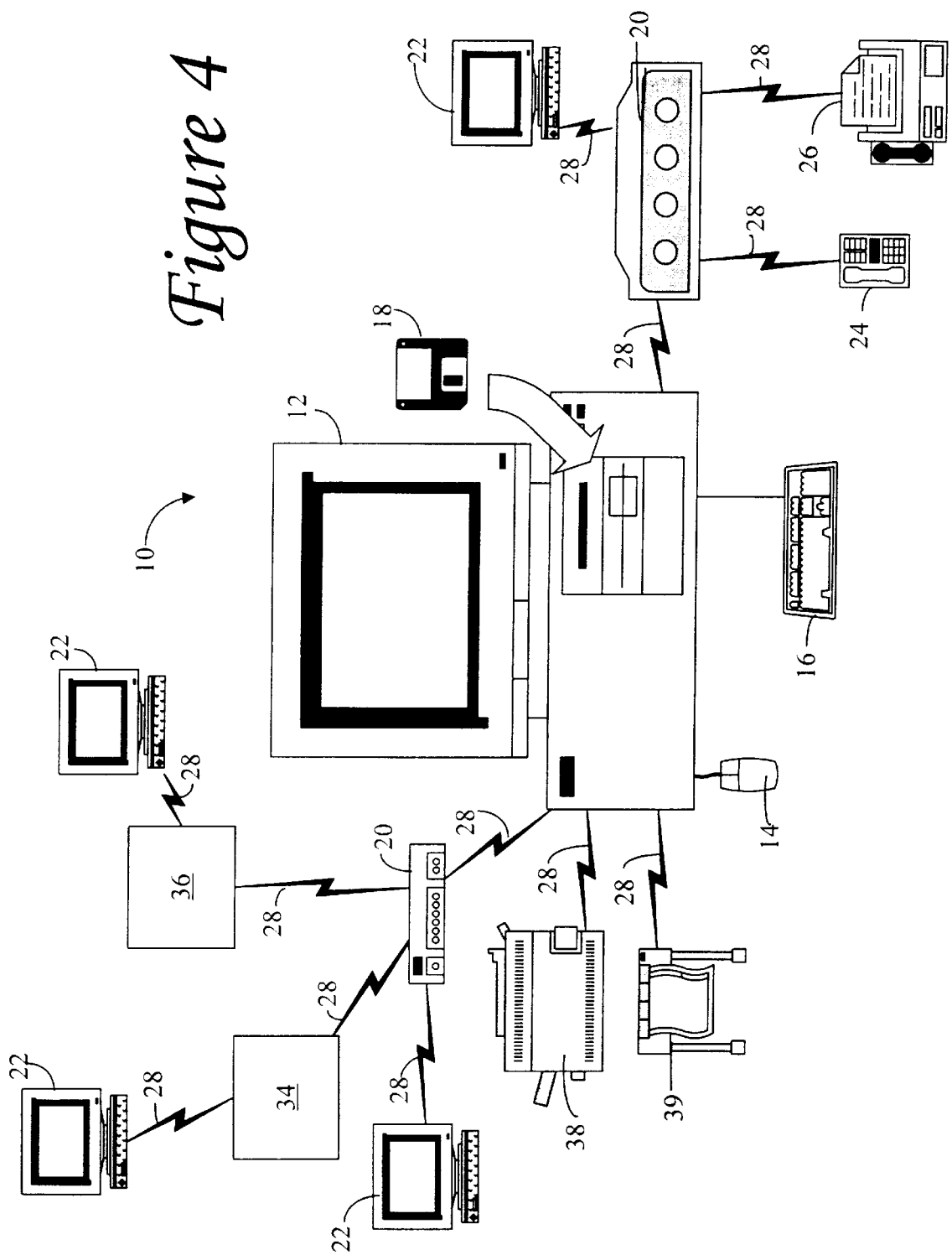
FIG. 4 depicts a computer system that may be used to implement the invention in some embodiments thereof.

FIG. 4 illustrates an apparatus 10 with which the method of the invention can be practiced. The apparatus 10 generally comprises a general purpose computer 12 that may be programmed to implement the methods of FIGS. 1 and 3 using input devices such as the mouse 14 and the keyboard 16 and/or a program storage device 18, such as a floppy or hard disk. Likewise, information regarding the worker's training activities and class scheduling may be input using the mouse 14 and the keyboard 16. The general purpose computer 12 may be an IBM compatible desktop computer manufactured by Micron Electronics, Inc. and employing a Windows® 95 or Windows® NT operating system. However, the invention is not so limited as other types of computers and operating systems may be suitable.

The computer 12 may receive and transmit information in a variety of ways as is shown in FIG. 4. For instance, a modem 20, which may be either external to the computer 12 as shown or internal to the computer 12, can be used to send information to a workstation 22, a telephone 24, and/or a facsimile machine 26 over communications link 28. Communications links 28 may be either wireless or wired using cable or fiber optics depending on the embodiment implemented. Information can also be sent to and received from the computer 12 via a suitable server 30 to any workstation 32 via an intranet 34 or the Internet 36. Note that the intranet 34 may be either a local area network ("LAN") or a wide area network ("WAN"). Information can also be output in hard copy using commonly encountered peripherals such as printer 38 and/or plotter 39.

Figure 5:
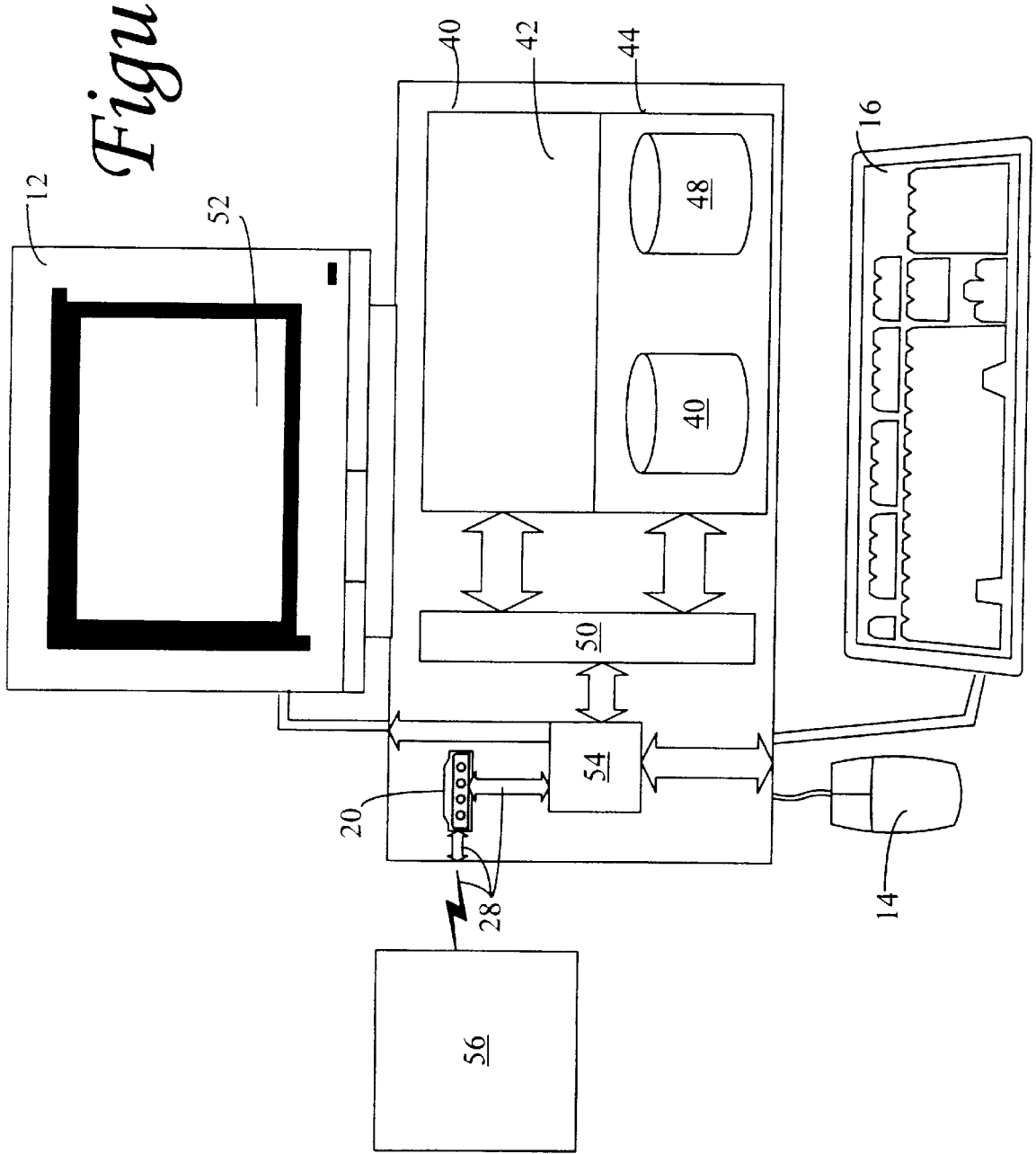
FIG. 5 illustrates a particular computer such as might be employed in the computer system of FIG. 4.

FIG. 5 conceptually illustrates one embodiment of the computer 12 programmed in accordance with the present embodiment. The computer 12 of this particular embodiment includes a program storage device 40 of which a first part 42 is encoded with instructions. The instructions, when executed by the computer 12, implement the automated method of the invention such as the particular embodiments of FIGS. 1 and 3. A second part 44 of the program storage device stores the worker's training information in a first database 46 and the class scheduling information in a second database 48. The precise number of databases is not vital to the practice of the invention and some embodiments may preferably employ as many as four as set forth below.

The program storage device 40 in the particular embodiment pictured is the hard drive of the computer 12. However, the invention is not so limited. The program storage device 40 in some embodiments may be the floppy diskette 18 shown in FIG. 4. Similarly, some alternative embodiments might even implement the program storage device 40 in some kind of read only memory ("ROM") such as an erasable programmable memory ("EPROM"), or a compact disk ("CD-ROM").

The processor 50 of the computer 12 reads and executes the instructions encoded in part 42 of the program storage device 40. The trainer interfaces with the computer 12 using the monitor 52, the mouse 14, and the keyboard 16 in a manner well known in the art. The microprocessor 50 interfaces with the world outside the computer 12 through input/output ("I/O") controller 54, which routes information output by the computer 12 to an indicated destination 56 through the appropriate communications channel and presents the input information received by the computer 12 to the processor 50. The I/O controller 54 uses modem 20 to perform some of these tasks, which in the embodiment of FIG. 5 is internal to the computer 12.

Figure 6:
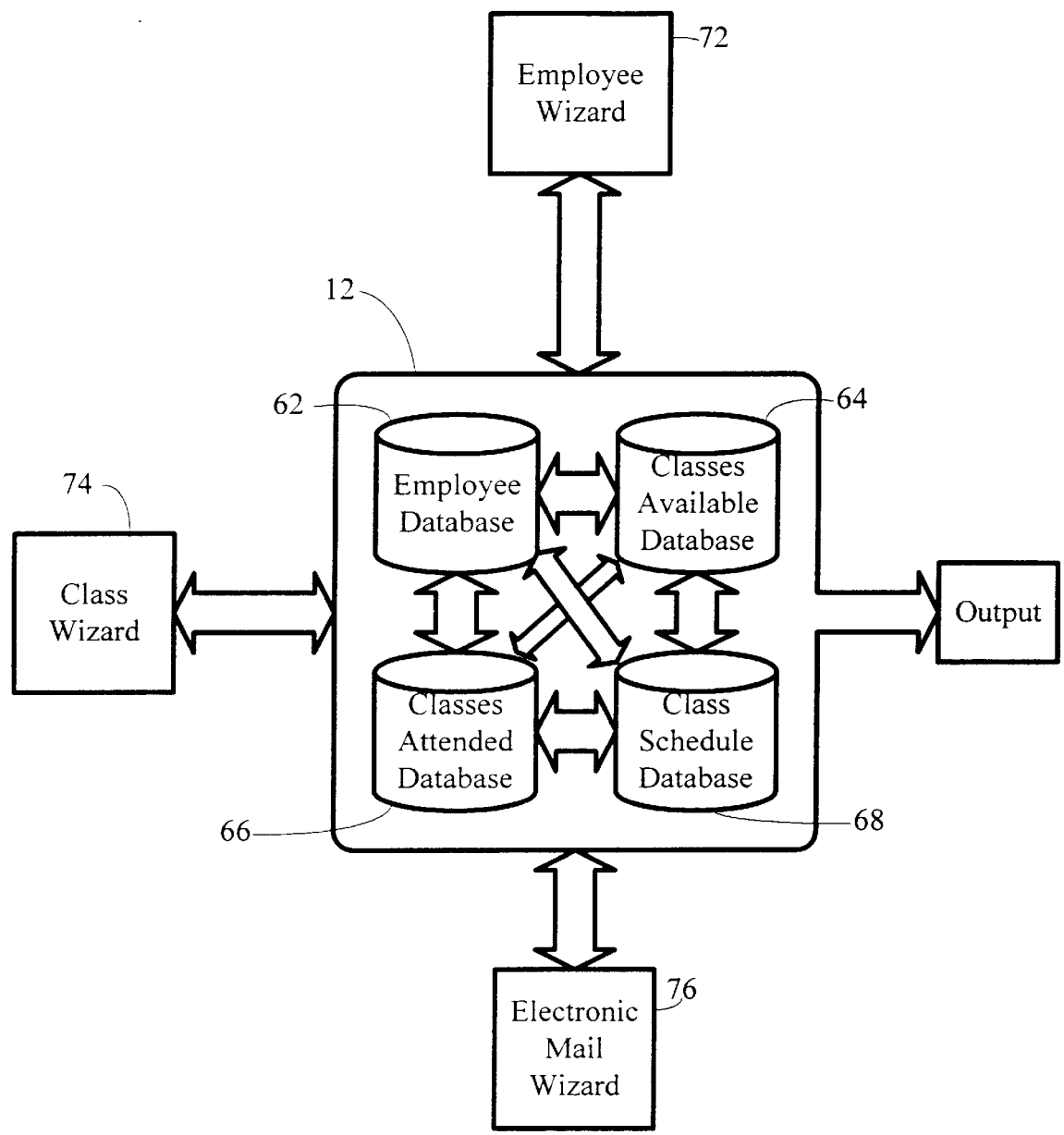
FIG. 6 conceptually illustrates one embodiment of a computer such as is used in one particular embodiment of the invention.

FIG. 6 conceptually illustrates the computer 12 programmed to perform one embodiment of the invention. This particular embodiment tracks information for a plurality of workers and a plurality of classes and communicates with the workers over an intranet. The worker and class information may be stored in four databases:

(1) an employee database 62 containing one record per employee, each record including fields for the employee's name, identification number, phone extension, hire date, and electronic mail address;

(2) a classes available database 64 containing one record per class, each record including fields for the class identification number, description, length, prerequisites, and notes about the class;

(3) a classes attended database 66 containing one record per employee per class, each record containing fields for the employee's identification number, the class identification number, and the class date; and (4) a classes scheduled database 68 containing one record per class, each record including fields for the class identification number, description, date, time, instructor, length, and the employees scheduled to attend.

The embodiment of FIG. 6 employs four databases, as opposed to two databases as discussed above, to facilitate operations during maintenance and to improve execution speed.

Also, the records in each database may be indexed by any field. Thus, since the databases contain overlapping information, they are interrelated and information in one database can be correlated with information in another. For instance, an employee's identification number may be found in both the employees database 62 and in the classes attended database 66, so the information in those databases can be cross-indexed using the employee's identification number. For the trainer's convenience, records may be handled as "lists," each list comprising one record, and the content of the list depending on the record contents.

The trainer may interface with the software using three dialog boxes known in the art as "wizards" in this particular embodiment. The use of wizards is not necessary to the practice of the invention and other embodiments may employ other interfaces. Likewise, other embodiments may use more or fewer wizards. The three wizards of the present embodiment and there functions are:

(1) an employee wizard 72, which enables the trainer to enter information for a new employee, amend information for an existing employee, and schedule an employee for a class;

(2) a class wizard 74, which enables the trainer to ascertain which employees have been scheduled to take a class, to schedule employees for a class and to notify the employee of the class schedule; and (3) an electronic mail wizard 76, which enables the trainer to generate output of all sorts as described below.

Note that the class wizard 74 may be called from the employee wizard 72 and the electronic mail wizard 76 may be called from the class wizard 74 although this is not necessary to the practice of the invention.

FIGS. 7A–7D illustrate one embodiment of the invention employed with the computer 12 of FIG. 6. The method is encoded in computer readable instructions that may be stored on any program storage medium, preferably a the hard disk 40 of computer 12. Thus, the computer 12 is programmed to perform the method of FIGS. 7A–7D. The computer 12 may likewise be programmed to perform the methods of FIGS. 1 and 3 in alternative embodiments.

Figure 7A:
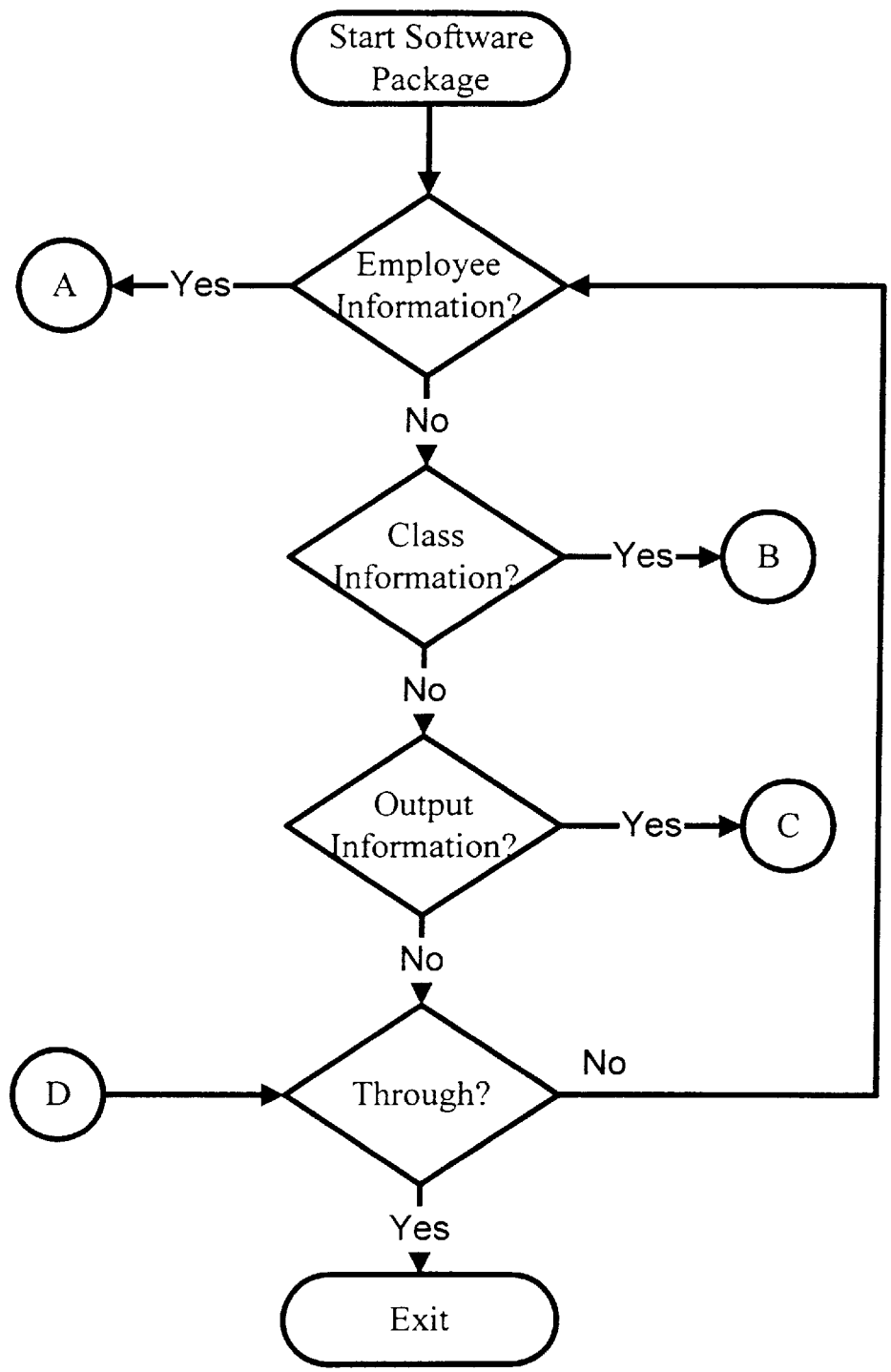
FIGS. 7A–7D chart the logic flow of one particular embodiment of the invention as implemented on the particular computer of FIG. 6.

Turning now to FIG. 7A, the program is started and the trainer is presented with several options. In the particular embodiment illustrated, the trainer may input employee information, input class information, output information previously input, or exit the program. The choices may be presented sequentially or contemporaneously and in the form of a pull-down menu or a wizard dialog box. The trainer may also cycle through the decision-making process allowing the user to perform more than one function when the program is accessed. Depending on the decision made, the program either calls the employee wizard 72, the class wizard 72, or the electronic mail wizard 76.

Figure 7B:
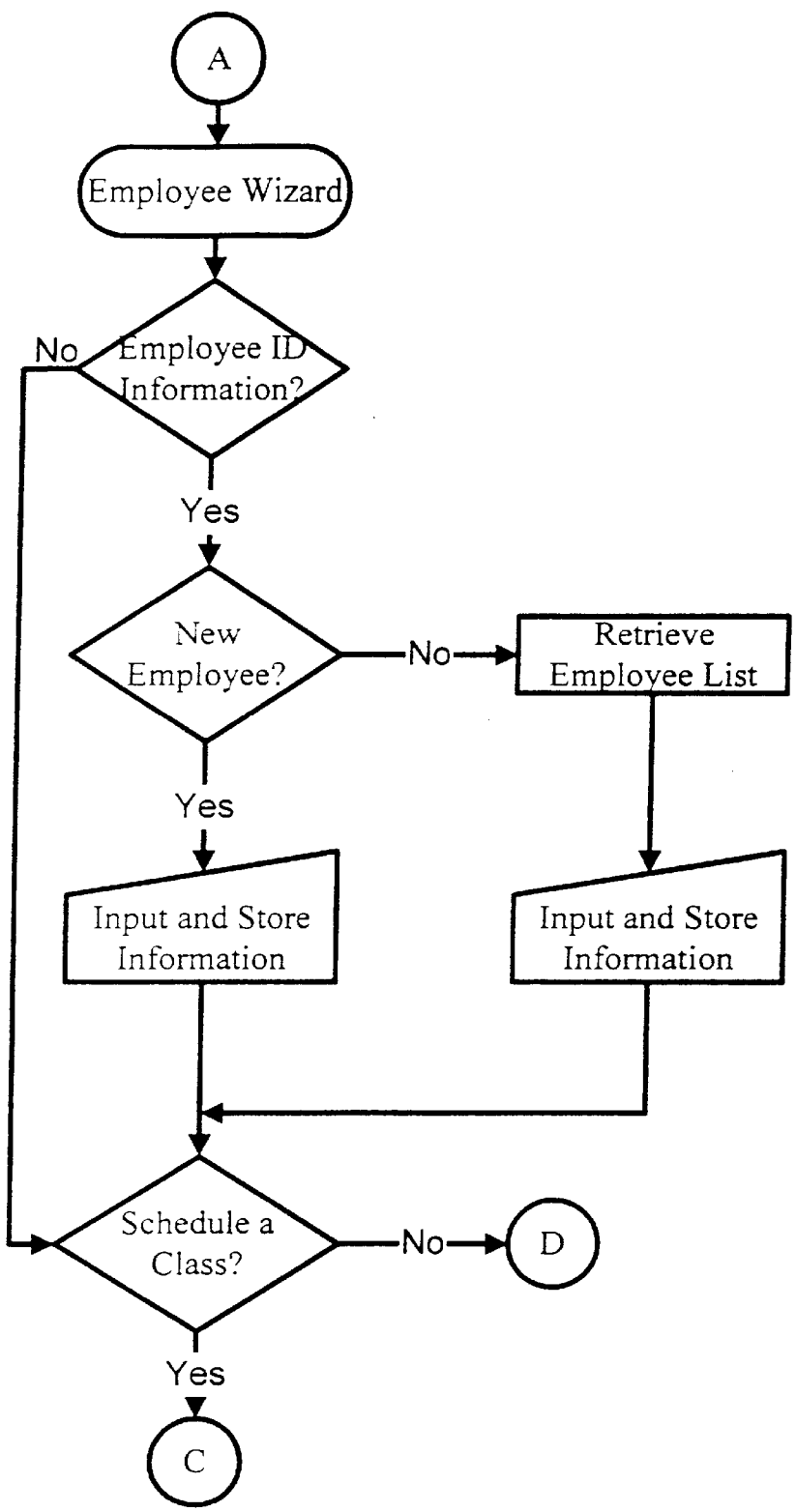

FIG. 7B illustrates the logic flow of the program when the employee wizard 72 is called. The trainer may, from the employee wizard 72, either input employee information or schedule a class These choices may be presented sequentially or contemporaneously and in the form of either a pull-down menu or a dialog box. If employee information is to be input, it will be either information about a new employee or new information about an existing employee. If the employee is new, the trainer inputs the employee's information, the program stores the information in the employees database. The trainer is then presented once again with the choice of scheduling the class. If a class is to be scheduled, the program calls the class wizard 72. Otherwise, the program returns to opening decision level illustrated in FIG. 7A.

Figure 7C:
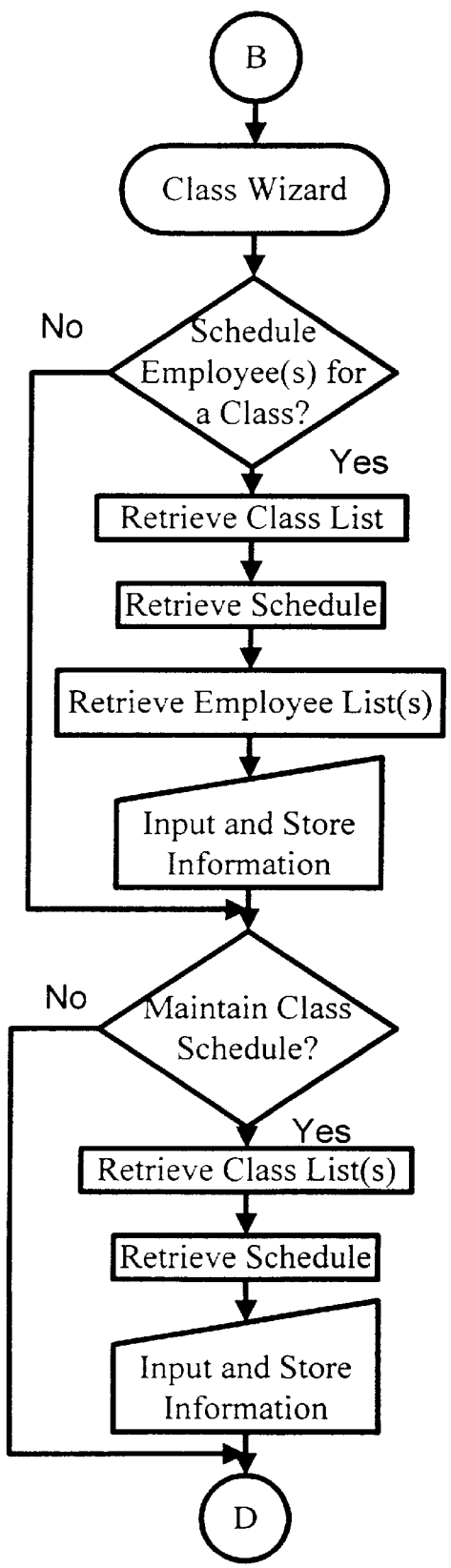

FIG. 7C illustrates the program's logic flow when the class wizard 72 is called. The trainer may either schedule employee(s) for a class or maintain the class schedule. These choices may be presented sequentially or contemporaneously and in the form of either a pull-down menu or a dialog box. For class selection, the trainer may assign an individual employee to a class, a select group of employees to a class, or all scheduled employees to a class. The trainer may also assign an individual employee to a single class, a select group of classes, or all scheduled classes. For class maintenance, the trainer may create a new class, alter the schedule of an existing class, enter the employee results in a class. In some embodiments, the trainer may cycle through the logic flow of FIG. 7C. When finished, the trainer returns to the primary decision level of FIG. 7A.

Figure 7D:
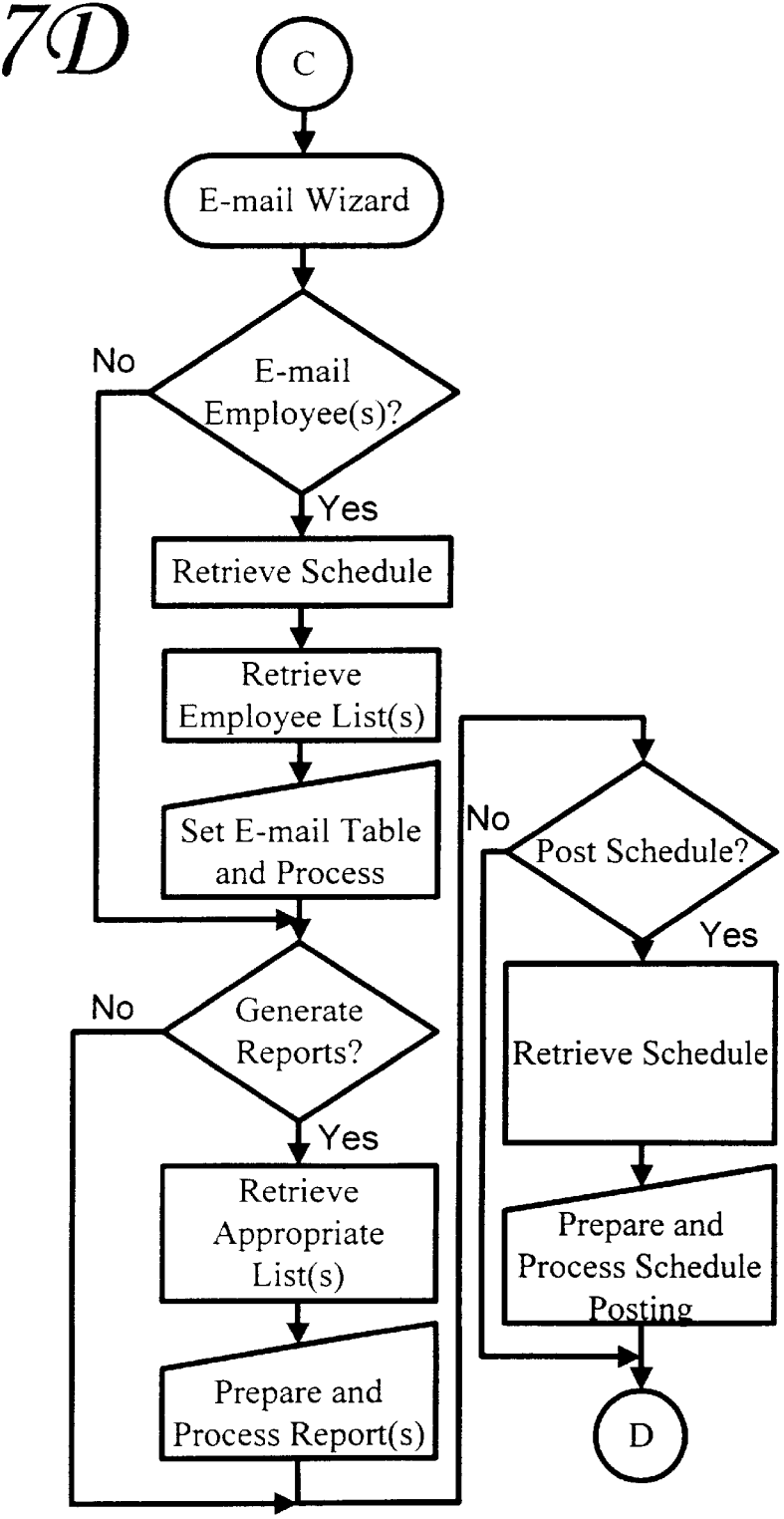

FIG. 7D illustrates the logic flow when the electronic mail wizard 76 is called. Functions available from this wizard can be categorized as e-mailing employees with information about classes, generating reports, or posting class schedules. These choices may be presented sequentially or contemporaneously and in the form of either a pull-down menu or a dialog box. Note that other embodiments employ some other form of electronic communication with employees. This particular embodiment, like the embodiment of FIG. 3, automatically e-mails selected employees by generating an e-mail table from the classes scheduled and employee databases 62. Also, a variety of reports might be generated. Reports such as graphs and charts and awards or certificates can be generated in response to trainer queries. This feature includes a text editor, a messaging application programming interface ("MAPI") to perform these functions. Again, the trainer can cycle through the logic of FIG. 7D and then return to the primary decision level of FIG. 7A.

Thus, the invention in its various embodiments addresses many problems found in the prior art. The particular embodiments disclosed above, however, are illustrative only as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for managing worker training activities, the method comprising:

tracking training information associated with a plurality of workers;

tracking information regarding one or more available classes for the plurality of workers to attend;

comparing the training information for one or more of the plurality of workers with the available classes information; and automatically electronically contacting the one or more workers regarding attending at least one of the one or more available classes in response to the act of comparing.

2. The method of claim 1, wherein the act of tracking the training information of a plurality of workers includes at least one of the following acts:

maintaining a list of classes attended by at least one of the workers;

scheduling at least one of the workers for a first selected class in response to user input;

assigning at least one of the workers to attend a predetermined plurality of core classes including at least one of the available classes; and assigning at least one of the workers to attend a second available class that has not previously been offered.

3. The method of claim 2, further comprising the act of permitting at least one of the workers to attend at least one of the available classes upon request of the at least one worker.

4. The method of claim 1, wherein the act of tracking the one or more available classes includes at least one of the following acts:

scheduling at least one of the available classes;

scheduling a plurality of course sections for at least one of the at least one available classes; and recording the enrollment of the at least one of available classes.

5. The method of claim 1, wherein the act of comparing the training information with the available classes information includes at least one of the following acts:

comparing the at least one available classes with a list of classes previously attended by at least one of the workers;

comparing the available class information with a list of classes at least one of the workers is scheduled to attend; and comparing identifying information about at least one of the available classes with identifying information about a specified class.

6. The method of claim 1, wherein the act of automatically electronically contacting the one or more workers includes at least one of generating a phone message and generating an electronic mail message.

7. The method of claim 6, wherein the act of automatically electronically contacting the one or more workers includes contacting the one or more workers over at lest one of an intranet, a local area network, the Internet, a wide area network, and a telephone system.

8. The method of claim 1, further comprising:

receiving a reply from at least one of the workers responsive to the act of automatically electronically contacting;

enrolling the at least one responding worker in the at least one available classes responsive to the reply; and tracking a performance of the at least one responding worker in the enrolled class.

9. A program storage device encoded with instructions that, when executed by a computer, implement a method for managing worker training activities, the method comprising:

tracking training information associated with a plurality of workers;

tracking information regarding one or more available classes for the plurality of workers to attend;

comparing the training information for one or more of the plurality of workers with the available classes information; and automatically electronically contacting the one or more of the plurality of workers regarding attending at least one of the one or more available classes in response to the act of comparing.

10. The program storage device of claim 9, wherein the instructions for tracking the training information of a plurality of workers include instructions for performing at least one of the following acts:

maintaining a list of classes attended by at least one of the plurality of workers;

scheduling at least one of the plurality of workers for a first selected class in response to user input;

assigning at least one of the plurality of workers to attend a predetermined plurality of core classes including at least one of the available classes; and assigning at least one of the plurality of workers to attend a second available class that has not previously been offered.

11. The program storage device of claim 10, wherein the instructions further comprise instructions for permitting at least one of the plurality of workers to attend at least one of the available classes upon request of the at least one worker.

12. The program storage device of claim 9, wherein the instructions for tracking the one or more available classes include instructions for scheduling at least one of the available classes;

scheduling a plurality of course sections for at least one of the at least one available classes; and recording the enrollment of the at least one of the at least one available classes.

13. The program storage device of claim 9, wherein the instructions for comparing the training information with the available classes information includes instructions for performing at least one of the following acts:

comparing the at least one available classes with a list of classes previously attended by at least one of the plurality of workers;

comparing the available class information with a list of classes at least one of the plurality of workers is scheduled to attend; and comparing identifying information about at least one of the available classes with identifying information about a specified class.

14. The program storage device of claim 9, wherein the act of automatically electronically contacting the one or more workers includes instructions for generating at least one of the following types of messages: phone and electronic mail.

15. The program storage device of claim 14, wherein the act of automatically electronically contacting the one or more workers includes instructions for generating a message includes instructions to use at least one of an intranet, a local area network, the Internet, a wide area network, and a telephone system.

16. The program storage device of claim 9, further comprising instructions for:

receiving a reply from at least one of the workers responsive to the act of automatically electronically contacting;

enrolling the at least one responding worker in the at least one available classes responsive to the reply; and tracking a performance of the at least one responding worker in the enrolled class.

17. A method to manage training activities for a plurality of workers, the method comprising:

assigning a worker to one or more classes based on a specified criteria;

determining if the worker has yet to attend the assigned one or more classes, those assigned and unattended classes referred to as needed classes;

identifying a plurality of available classes;

identifying those classes that are both needed and available as goal classes;

transmitting a signal to query the worker about attending the goal classes;

receiving a reply from the worker in response to the query signal; and enrolling the worker in the goal classes responsive to the reply signal.

18. The method of claim 17, wherein the act of assigning uses a criteria based on at least one of the following:

determining if the a job requirement for the worker requires a specified one or more classes;

identifying one or more core classes;

determining if the worker is a new employee;

determining if the worker requests a specified one or more classes; and determining if a trainer assigns the worker to a specified one or more classes.

19. The method of claim 17, further comprising receiving and storing an indication of how well the worker performs in one or more of the enrolled courses.

20. The method of claim 19, further comprising electronically notifying the worker of the stored performance indication.

21. The method of claim 17, wherein the act of identifying a plurality of available class includes at least one of:

scheduling at least one of the plurality of available classes and recording an enrollment of the at least one scheduled class; and scheduling a plurality of class sections for at least one of the plurality of available classes and recording an enrollment of the at least one scheduled class.

22. The method of claim 17, wherein the act of transmitting a query signal comprises transmitting an electronic mail message to the worker.

23. A program storage device, readable by a computer, comprising stored instructions for causing the computer to:

assign a worker to one or more classes based on a specified criteria;

determine if the worker has yet to attend the assigned one or more classes, those assigned and unattended classes referred to as needed classes;

identify a plurality of available classes;

identify those classes that are both needed and available as goal classes;

transmit a signal to query the worker about attending the goal classes;

receive a reply from the worker in response to the query signal; and enroll the worker in the goal classes responsive to the reply signal.

24. The program storage device of claim 23, wherein the instructions to assign use a criteria based on at least one of the following:

determine if the a job requirement for the worker requires a specified one or more classes;

identify one or more core classes;

determine if the worker is a new employee;

determine if the worker requests a specified one or more classes; and determine if a trainer assigns the worker to a specified one or more classes.

25. The program storage device of claim 23, further comprising instructions to receive and store an indication of how well the worker performs in one or more of the enrolled courses.

26. The program storage device of claim 25, further comprising instructions to electronically notify the worker of the stored performance indication.

27. The program storage device of claim 23, wherein the instructions to identify a plurality of available classes includes instructions to perform at least one of:

schedule at least one of the plurality of available classes and recording an enrollment of the at least one scheduled class; and schedule a plurality of class sections for at least one of the plurality of available classes and recording an enrollment of the at least one scheduled class.

28. The program storage device of claim 23, wherein the instructions to transmit a query signal comprise instructions to transmit an electronic mail message to the worker.

\* \* \* \* \*

UNITED STATES PATENT AND TRADEMARK OFFICE
CERTIFICATE OF CORRECTION

PATENT NO. : 6,409,514 B1
DATED : June 25, 2002
INVENTOR(S) : Jeffrey A. Bull

It is certified that error appears in the above-identified patent and that said Letters Patent is hereby corrected as shown below:

Column 10,
Lines 40-41, "determining if the worker has yet to attend the assigned one or more classes, those assigned and unattended classes referred to as needed classes;" should be -- determining if the worker has yet to attend the assigned one or more classes; automatically determining needed classes, needed classes being those classes that are assigned and unattended; --
Line 47, after "reply" insert -- signal --.

Column 11,
Line 2, "class" should be -- classes --.

Signed and Sealed this

Fifteenth Day of October, 2002

*Attest:*

*Attesting Officer*

JAMES E. ROGAN
*Director of the United States Patent and Trademark Office*